United States Patent [19]
Whitesmith

[11] Patent Number: 5,249,247
[45] Date of Patent: Sep. 28, 1993

[54] OPTICAL FIBRE SPLICING DEVICE

[75] Inventor: Peter J. Whitesmith, Wettenhall, England

[73] Assignee: Bicc plc, England

[21] Appl. No.: 862,336

[22] Filed: Apr. 2, 1992

[30] Foreign Application Priority Data

Apr. 3, 1991 [GB] United Kingdom ............... 9106981

[51] Int. Cl.[5] .............................................. G02B 6/38
[52] U.S. Cl. ...................................... 385/96; 385/97;
219/121.11
[58] Field of Search ........................... 385/96, 97, 98;
219/121.11, 121.12

[56] References Cited

U.S. PATENT DOCUMENTS

| 4,313,744 | 2/1982 | Toda | 65/4.21 |
| 4,319,902 | 3/1982 | Hensel | 385/96 X |
| 4,548,669 | 10/1985 | Steinmann et al. | |
| 5,002,351 | 3/1991 | Szanto et al. | 385/96 |
| 5,046,813 | 9/1991 | Itoh et al. | 385/96 |

FOREIGN PATENT DOCUMENTS

| 0144603 | 6/1985 | European Pat. Off. |
| 0321947 | 6/1989 | European Pat. Off. |
| 3245229 | 6/1984 | Fed. Rep. of Germany |
| 1543187 | 3/1979 | United Kingdom |
| 2074338 | 10/1980 | United Kingdom |
| 2175410 | 11/1986 | United Kingdom |
| 2189048 | 10/1987 | United Kingdom |

Primary Examiner—John D. Lee
Assistant Examiner—Stephen W. Barns
Attorney, Agent, or Firm—Anthony J. Casella; Gerald E. Hespos

[57] ABSTRACT

Simple and inexpensive optical fibre splicing apparatus comprises a splicing station comprising a fibre support table and a pair of electrodes; high voltage circuitry for striking an arc; clamp assemblies at opposite ends of the table for holding end parts of aligned fibres on the table with their end faces spaced a predetermined distance apart between the electrodes, a part of at least one of the clamp assemblies being constrained to move towards and away from the other; mechanical means for controlling movement of the part of the movable clamp assembly; and a firing button for actuating the high voltage circuitry and mechanical control means. Preferably, a low voltage power source is housed in a casing separately formed with respect to the casing of the splicing station and is connected to the high voltage circuitry of the splicing station by a flexible cable.

11 Claims, 5 Drawing Sheets

OPTICAL FIBRE SPLICING DEVICE

This invention relates to effecting a fusion splice between two optical fibres, one or each of which may be a component of an optical cable, and is particularly concerned with the actual fusion splicing operation effected immediately after end parts of the two optical fibres have been prepared and positioned for fusion splicing.

In preparing and positioning end parts of two optical fibres for fusion splicing, it is necessary to ensure that:
  (i) each optical fibre has a substantially flat end face lying in a plane radial to the fibre axis;
  (ii) end parts of the optical fibres are so disposed that the cores of the fibres are in substantially axial alignment for optimum transfer of light from one fibre to the other; and
  (iii) the end faces of the axially aligned end parts of the optical fibres are spaced a predetermined distance apart.

The subsequent fusion splicing operation comprises two stages which are effected in sequence. During the first of these two stages, the end parts of the two optical fibres are heated rapidly by means of an arc struck between electrodes disposed on opposite sides of the end parts of the optical fibres to a temperature such that at least the extreme end parts of the optical fibres are in a softened state and, thereafter, during the second stage of the fusion splicing operation, the end part of one or each optical fibre is moved axially towards and against the end part of the other optical fibre to a predetermined extent and at a predetermined rate for a predetermined period of time to enable the aligned and softened end parts of the optical fibres to fuse together.

Optical fusion splicing apparatus hitherto proposed and used to effect the actual fusion splicing operation generally operate automatically or semiautomatically and require accurately tooled equipment and complicated electronic circuitry to ensure that the period of time that ensues during initial heating of the end parts of the fibres to bring them to a softened state, the extent of axial movement of one or each end part of the fibres towards and against the other, the rate at which the end parts are caused to abut and the period of time that ensues after the softened end parts have been caused to abut will always be such that a satisfactory fusion splice between end parts of two optical fibres can be repeatedly obtained. As a consequence, such optical fibre fusion splicing apparatus is expensive. Moreover, the quantity and fragile nature of the component parts of such splicing apparatus necessitates the provision of a strong, substantially rigid protective casing in which the component parts of the apparatus are housed, which casing, though portable, is of substantial weight.

It is an object of the present invention to provide improved apparatus for effecting a fusion splice between prepared and axially aligned end parts of two optical fibres, which improved apparatus is substantially less expensive than optical fibre fusion splicing apparatus hitherto proposed and used and which improved apparatus, in its preferred form, is readily portable from place to place and is especially suitable for use in the field.

According to the invention, the improved optical fibre fusion splicing apparatus comprises a splicing station comprising an elongate table comprising at least one surface for supporting prepared and axially aligned end parts of two optical fibres and a pair of electrodes transversely spaced on opposite sides of said elongate table intermediate of its ends; high voltage circuitry for striking an arc between said transversely spaced electrodes for fusion splicing axially aligned end parts of two optical fibres positioned therebetween; devices disposed at or near opposite ends of the elongate table for directly or indirectly holding end parts of two optical fibres that have been axially aligned on said table with their prepared end faces spaced a predetermined distance apart at a region intermediate of said holding devices and between said transversely spaced electrodes, at least a part of at least one of said holding devices being constrained to move to a limited extent towards or away from the other holding device in a direction substantially parallel to axially aligned end parts of two optical fibres when supported on said table so that when said part of the movable holding device is constrained to move to a limited extent towards said other holding device the end part in the movable holding device will be moved axially towards the other end part; mechanical means for controlling movement of said movable holding device towards said other holding device; and a master switch for actuating said high voltage circuitry and said mechanical control means, the arrangement being such that, when said switch is operated to cause an arc to be struck between said transversely spaced electrodes and to actuate said mechanical control means, the rate of controlled movement of said part of the movable holding device towards the other holding device will be such that a predetermined period of time will elapse between striking of the arc and abutment of the prepared end faces of the axially aligned end parts of the fibres sufficient for the arc to bring said two end parts to a softened state appropriate for fusion splicing and that, thereafter, said prepared and softened end faces will be urged into abutting relationship so that a fusion splice between said abutting axially aligned end parts will be effected.

Preferably, whilst prepared and softened end faces of optical fibre end parts are abutting and a fusion splice is being effected between the abutting axially aligned end parts, the mechanical means for controlling movement of said part of the movable holding device towards the other holding device is also adapted to control limited movement of at least a part of at least one of said holding devices away from the other holding device.

The mechanical means for controlling movement of said part of the movable holding device towards the other holding device preferably comprises at least one main spring so disposed as to urge said part of the movable holding device towards said other holding device at said predetermined rate when the or each main spring is actuated by operation of said master switch, and at least one damper which controls the rate of movement of said part of the movable holding device under the action of said main spring or springs to provide a predetermined period of time sufficient to enable the arc struck between said transversely spaced electrodes to bring axially aligned end parts of two optical fibres to an appropriate softened state before the prepared and softened end faces of the end parts abut. The or each damper may itself be at least one supplementary spring which is acting against the force exerted by said main spring or springs and which must be overcome by said main spring or springs. Alternative forms of damper that may be employed include pneumatically and hydraulically controlled pistons and spring controlled rack and pinion devices.

Where the mechanical means also controls limited movement of at least a part of at least one of the holding devices away from the other holding device, preferably the two holding devices are so inter-engaged, that when said part of the movable holding device has been caused to move towards the other holding device under the action of said main spring or springs to a predetermined extent, said main spring or springs directly or indirectly causes or cause said part of the other holding device to move to a limited extent away from said movable holding device.

The optical fibre holding devices preferably each comprise a two-part clamp for gripping an end part of an optical fibre but it is to be understood that any convenient form of device for so holding an optical fibre that relative lengthwise movement of the fibre with respect to at least a part of the device is substantially restrained may be employed.

By way of example, a typical period of time sufficient for the arc to bring the axially aligned end parts of two optical fibres to an appropriate softened state is 0.5 second; a typical period of time during which one softened end part is urged towards and against the other softened end part is 1 second and the time taken for a complete fusion splice to be effected is approximately 3 seconds.

Since positioning and relative movement of the prepared and axially aligned end parts of two optical fibres to be fusion spliced are wholly mechanically controlled and the means for this purpose require little space, the improved optical fibre fusion splicing apparatus of the present invention has the very important advantage that the splicing station with its elongate support table and transversely spaced electrodes; the high voltage circuitry for striking an arc between the electrodes; and the longitudinally spaced holding devices and associated mechanical control means can be housed in a casing which is separately formed with respect to a casing housing a low voltage power source which can be electrically connected to the high voltage circuitry by a flexible electric cable. In practice, the casing housing the low voltage power source preferably is adapted to be clipped or otherwise supported on a belt worn by an operator and the casing housing the splicing station with its elongate table and electrodes, the high voltage circuitry, and the holding devices and associated mechanical control means can be of such a size that it can be readily held in a hand of an operator.

The improved optical fibre splicing apparatus of the present invention may have associated with its elongate table and positioned between its transversely spaced electrodes retractable spacing means against which bodies disposed on axially aligned end parts of two optical fibres can abut so that prepared end faces of optical fibre tails protruding from the bodies are spaced apart by a distance appropriate for the formation of a fusion splice therebetween but, preferably, the improved optical fibre splicing apparatus is especially, but not exclusively, suitable for use when employing the improved method of, and the improved component for use in, positioning two optical fibres relative to one another for the purpose of effecting a fusion splice therebetween as described and illustrated in the specification filed with our co-pending British Patent Application No: 92/07212.3 filed on the same day as the present application.

The improved method of our aforesaid co-pending application comprises the steps of:
(i) applying to each optical fibre at a position spaced from the end to be spliced a one-piece collar which is so disposed on the fibre that relative lengthwise movement therebetween cannot be effected without the application of a substantial force;
(ii) cleaving each optical fibre at a position between the collar and said end of the fibre to leave protruding from the collar an optical fibre tail of a predetermined length having substantially flat end face lying in a plane radial to the axis of the fibre, and
(iii) introducing said optical fibre tails into opposite ends of an open-ended substantially rectilinear guide passage in the splicing station of fusion splicing apparatus in such a way that the collars abut the remote faces of longitudinally spaced upstanding abutments and the optical fibre tails are in substantially axial alignment, the predetermined lengths of the optical fibre tails having regard to the distance between said abutments being such that said end faces of the optical fibre tails are disposed a predetermined distance apart appropriate for fusion splicing of the optical fibre tails.

To enable the improved fusion splicing apparatus of the present invention to be used also for effecting the improved method of positioning two optical fibres relative to one another for the purpose of effecting a fusion splice therebetween as described and illustrated in our aforesaid co-pending patent application, preferably each holding device of the improved fusion splicing apparatus is a two-part clamp consisting of an abutment upstanding from the support table and, beyond and at a predetermined distance from the abutment, a spring-loaded catch for urging a one-piece collar disposed on an optical fibre against the face of the abutment remote from the other abutment, so that the collar will be directly or indirectly clamped between the abutment and the spring-loaded catch which together effectively constitute the jaws of the two-part clamp. Preferably, the mechanical control means for controlling movement of said part of the movable two-part clamp is operatively coupled to the jaw of the clamp constituted by the upstanding abutment and the spring-loaded catch constituting the other jaw of the two-part clamp is movable with the abutment when a one-piece collar disposed on an optical fibre is directly or indirectly clamped between the abutment and the spring-loaded catch and the mechanical control means is actuated to cause the movable abutment to move towards the other of the two longitudinally spaced abutments.

Each abutment and/or each spring-loaded catch preferably has extending lengthwise therethrough a slot which opens into one side face thereof and through which can be passed a part of an optical fibre protruding from a one-piece collar disposed on the fibre.

Preferably, also, the remote faces of the abutments, i.e. the faces of the abutments against which one-piece collars disposed on optical fibres will be arranged to abut, and the faces of the spring-loaded catches to be urged against the opposite end faces of the collars are substantially flat and lie in planes substantially radial to the axis of a collar when clamped therebetween.

The surface of the elongate table may have formed therein for maintaining end parts of two optical fibres in substantially axial alignment, an open-ended substantially rectilinear groove which extends over at least a part of the length of the table between and substantially normal to the transversely spaced electrodes but, preferably, the elongate table intermediate of its ends and between the electrodes has means for positive removable location on the table of a preformed substantially rigid elongate support member having an open ended substantially rectilinear optical fibre guide passage extending between the ends of the member and having, at a position intermediate of the ends of the member, a slot or aperture which intersects said guide passage and extends transversely across the width of the support member and which will be in substantially axial alignment with the electrodes.

Preferably, the locating means is an elongate depression in the surface of the elongate table centrally disposed between the ends of the table and the electrodes lie on the central transverse axis of the depression so that a support member having its transversely extending slot or aperture centrally disposed between its ends will be positively located with its transversely extending slot or aperture in alignment with the electrodes.

The transversely spaced electrodes of the improved optical fibre fusion splicing apparatus may be retractable and constrained to move towards and away from each other in a direction substantially parallel to their axes.

The improved optical fibre fusion splicing apparatus is suitable for use in the method of effecting an end-to-end fusion splice between two optical fibres as described in the specification of our co-pending British Patent Application No: 91/04951 filed on 8th Mar., 1991.

The invention is further illustrated by a description, by way of example, of preferred apparatus for effecting a fusion splice between prepared and axially aligned end parts of two optical fibres with reference to the accompanying drawings, in which.

Figure 1:
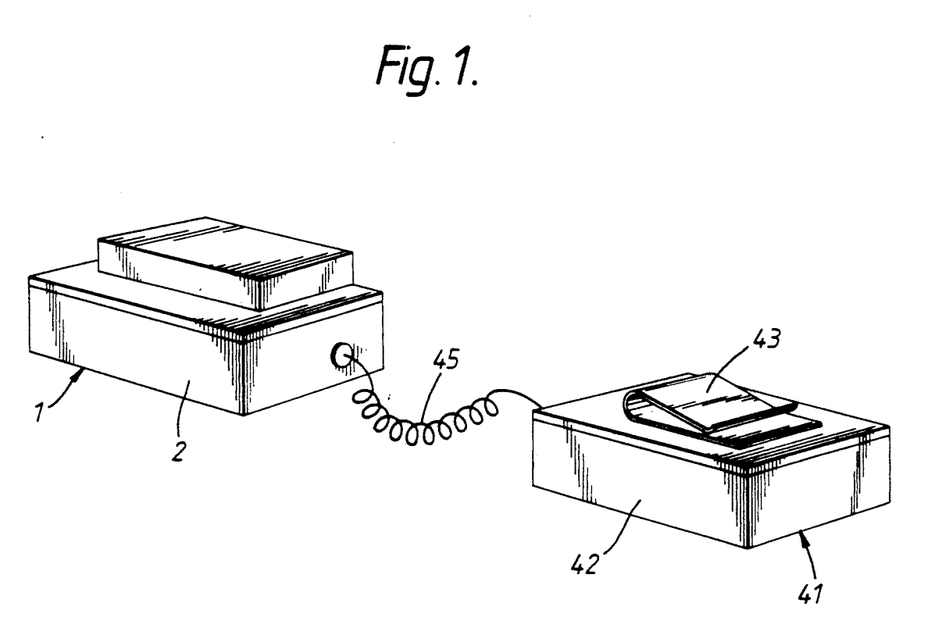
FIG. 1 is a diagrammatic pictorial view of the preferred apparatus.

Referring to FIG. 1 of the drawings, the preferred apparatus comprises a splicing station 1 and a low voltage power source 41, the splicing station, including a pair of transversely spaced electrodes and high voltage circuitry (not shown) for striking an arc between the electrodes for fusion splicing axially aligned end parts of two optical fibres when positioned between the electrodes, being disposed in a casing 2 and the low voltage power source being housed in a casing 42 which is separately formed with respect to the casing 2. The low voltage power source 41 is electrically connected to the high voltage circuitry of the splicing station 1 by a flexible electric cable 45. The casing 42 of the low voltage power source 41 has secured to its outer surface a resilient clip 43 by means of which the casing can be supported on a belt worn by an operator. The casing 2 of the splicing station 1 is of such a size that it can be held in a hand of an operator.

As will be seen on referring to FIGS. 2 to 5 of the drawings, the splicing station 1 comprises an elongate table 3 and a pair of electrodes 10 transversely spaced on opposite sides of the elongate table intermediate of its ends. High voltage circuitry (not shown) for striking an arc between the transversely spaced electrodes 10 is housed in the casing 2 of the splicing station 1. Disposed near opposite ends of the elongate table 3 are two two-part clamps 11,11' for indirectly holding end parts of two optical fibres in axial alignment on the table with the prepared end faces of the fibres spaced a predetermined distance apart and between the transversely spaced electrodes 10.

The elongate table 3 comprises three separately formed component parts consisting of two end parts 4 and an intermediate part 5. The intermediate part 5 has an uppermost surface in which is formed an open-ended rectilinear groove 7 for accommodating uncoated end parts of two optical fibres, the groove lying normal to the transversely-spaced electrodes 10. At each end of each end part 4 and in axial alignment with the groove 7 in the uppermost surface of the intermediate part 5 is an upstanding slotted guide 8 for assisting in location of an optical fibre in the groove 7. Intermediate of the ends of the intermediate part 5 is a channel 9 which is normal to the rectilinear groove 7 and which is in alignment with the transversely-spaced electrodes 10.

Each two-part clamp assembly 11,11' consists of an end part 4 of the elongate table 3 and a jaw 14 carried by a spring-loaded arm 13 mounted to pivot about a fixed main shaft 12 which is secured to the casing 2 and which extends parallel to the rectilinear groove 7 in the uppermost surface of the intermediate part 5 of the elongate table. The uppermost surface of the end part 4 is of a material having a low co-efficient of friction; the surface 15 of the jaw 14 which will bear against a coated optical fibre when disposed on the uppermost surface of the end part 4 is of a material having a high co-efficient of friction. The jaw 14 of each clamp assembly 11,11' is in screw-threaded engagement with a spindle 16 which is rotatably mounted in the arm 13 parallel to the main shaft 12, the jaw being restrained against rotation with respect to the arm. By rotating each spindle 16 in the appropriate direction by means of a knurled knob 17 on an end of the spindle, the jaw 14 and a coated optical fibre clamped by the jaw on the uppermost surface of the associated end part 4 can be moved with respect to the end part 4 towards or away from the common axis of the transversely-spaced electrodes 10 so that the prepared end faces of the optical fibres can be appropriately positioned relative to one another between the electrodes.

The jaw 14 of the two-part clamp assembly 11 is urged to move to a limited extent relative to the associated end part 4 towards the two-part clamp assembly 11' in a direction parallel to the rectilinear groove 7 in the uppermost surface of the intermediate part 5 of the elongate table 3 by a main coil spring 18 which is carried by the spindle 16 between an internal surface of the arm 13 and an adjustable stop 19 on the spindle.

Figure 2:
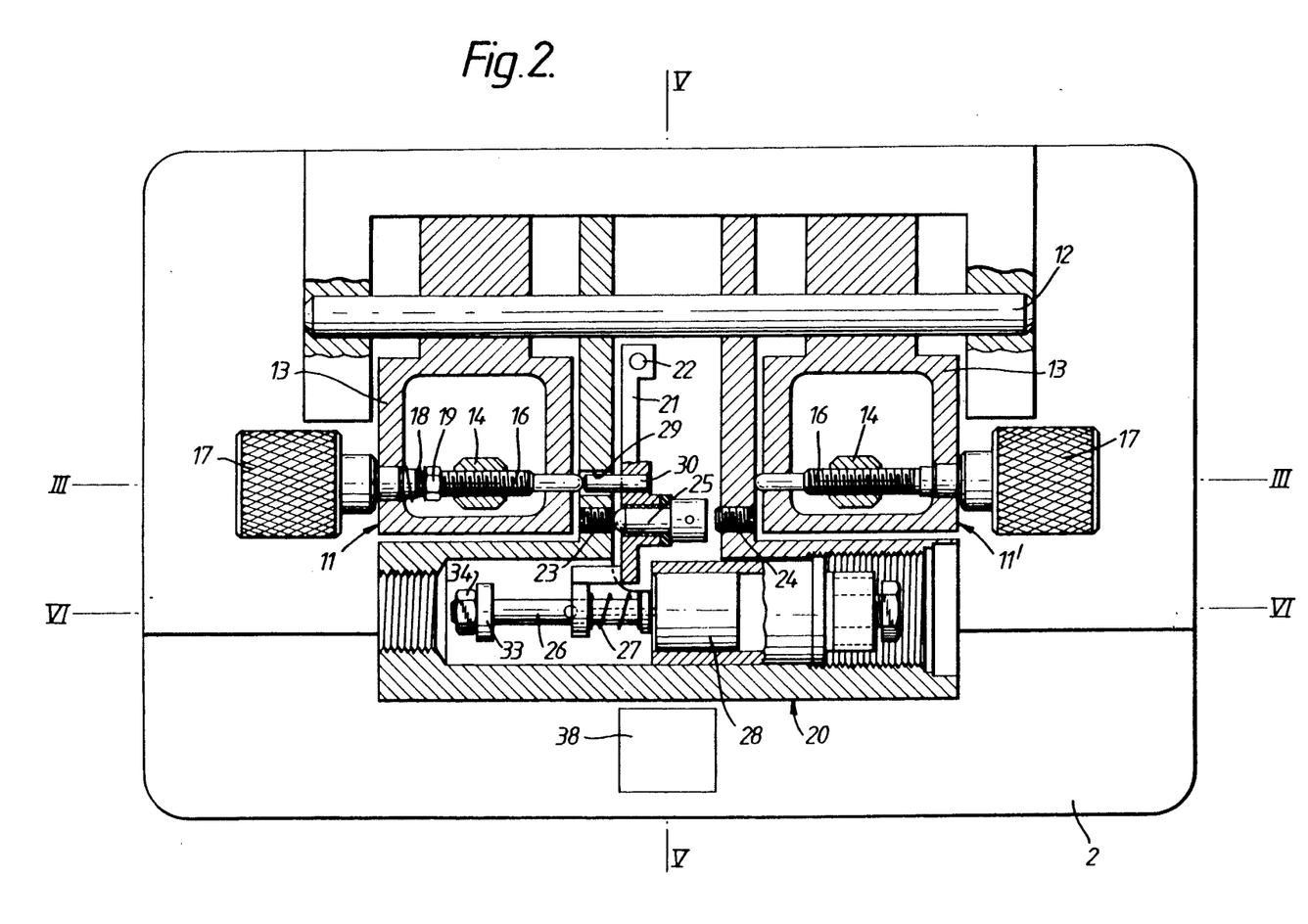
FIG. 2 is a view from above of the splicing station of the preferred apparatus with the mechanical control means in the loaded state, shown partly in section and partly in elevation.
Figure 3:
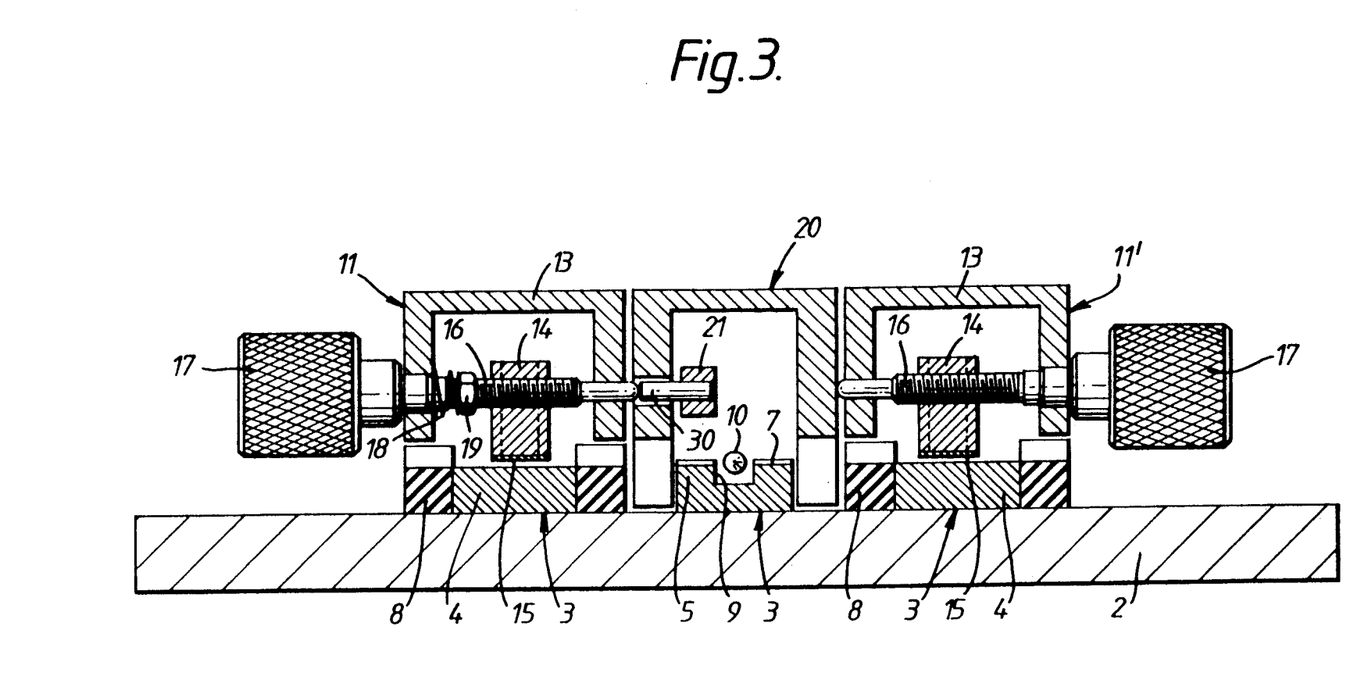
FIG. 3 is a cross-sectional view of the splicing station taken on the line III—III in FIG. 2.
Figure 4:
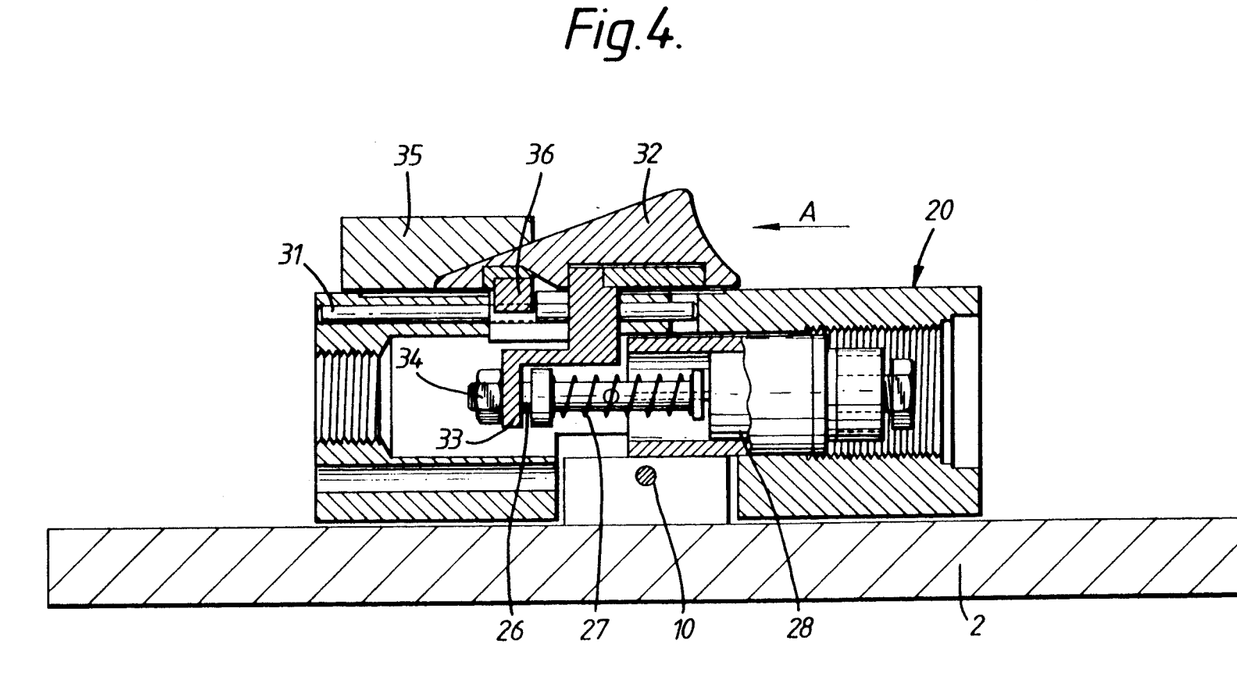
FIG. 4 is a cross-sectional view of the splicing station with the mechanical control means in the fired state, taken on the line IV—IV in FIG. 2.
Figure 5:
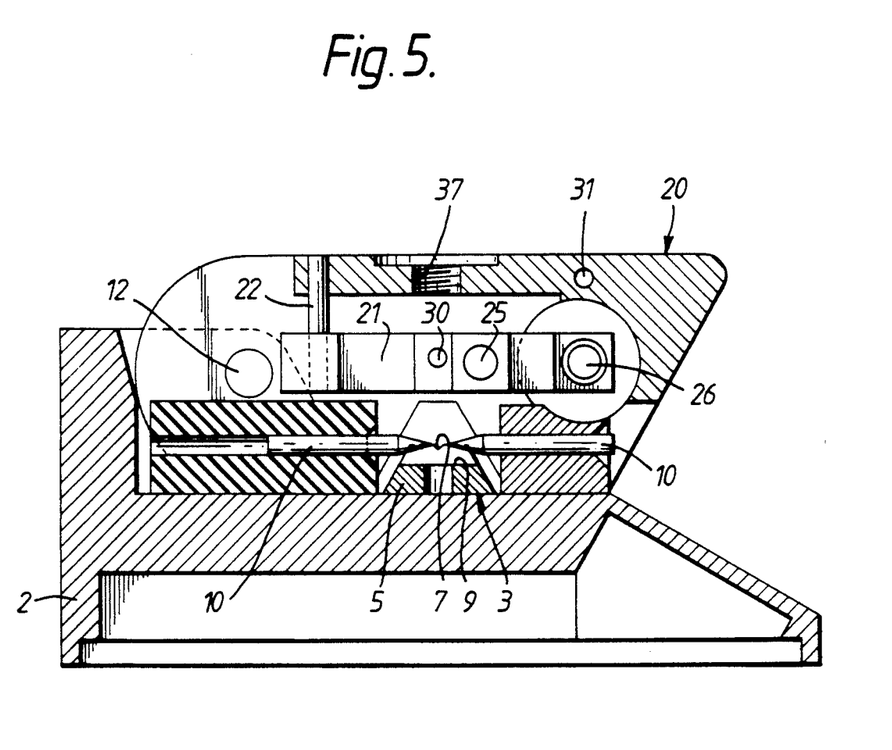
FIG. 5 is a cross-sectional view of the splicing station taken on the line V—V in FIG. 2.

Pivotally mounted on the fixed main shaft 12 between the spring-loaded arms 13 is a carriage 20 in which a lever 21 is pivotally mounted about a fixed spindle 22 which is normal to the main shaft. The extent of pivotal movement of the lever 21 can be determined by means of two adjustable stops 23, 24 positioned in opposite side walls of the carriage 20 so that an electrical contact 25, which is carried by but electrically insulated from the lever and which is connected by an insulated electric cable (not shown) to the control circuit of the high voltage circuitry, will abut one or other of the stops when the lever is pivoted about the spindle 22. In the loaded position of the splicing station 1 as shown in FIG. 2, the electrical contact 25 of the lever 21 is urged against the stop 23 by a damping coil spring 27 and associated damper 28 carried by a shaft 26 mounted in the carriage 20 and extending parallel to the main shaft 12. The lever 21 has between its ends a stud 30 which extends into a hole 29 in one side wall of the carriage 20 and which is in abutting engagement with the free end of the spindle 16 rotatably mounted in the arm 13 of the two-part clamp assembly 11, thereby, as shown in FIG. 2, resisting motion of the jaw 14 under the action of the main coil spring 18 towards the two-part clamp assembly 11'. The main coil spring 18, the damping spring 27 and associated damper 28 and the pivotally mounted lever 21 constitute the principal components of the control mechanism of the splicing station 1.

Loading of the control mechanism to the loaded position shown in FIG. 2 can be effected by means of a loading button 32 which is slidably mounted on a shaft 31 which is housed in the carriage 20 and which extends parallel to the main shaft 12. Secured to and dependant from the loading button 32 is a cranked lever 33 which near its free end has a hole through which the shaft 26 protrudes and which near its free end abuts a stop 34 at the free end of the shaft. By sliding the loading button 32 in the direction of Arrow A (FIG. 4), the control mechanism can be loaded as shown in FIG. 2. Actuation of the control mechanism can be effected by depression of a firing button 35 which constitutes the master switch and is mounted on the top of the carriage 20 and which is adapted to release a stop 36 temporarily preventing extension of the damping spring 27.

The carriage 20 also has immediately above the transversely extending channel 9 in the intermediate part 5 of the elongate table 3 an internally screw-threaded hole 37 in which a microscope (not shown) can be detachably connected.

The casing 2 of the splicing station 1 has an on/off switch 38 by means of which the electrical power must be switched on before the splicing station can be employed. The high voltage circuitry associated with the transversely-spaced electrodes 10 is conventional and will therefore not be described.

In a modification of the splicing station 1 as shown in FIGS. 2 to 5, to facilitate feeding of optical fibres into the slotted guides 8 and rectilinear groove 7 of the elongate table 3, the electrodes 10 may be housed in the pivotally mounted carriage 20.

When using the preferred apparatus to effect a fusion splice between prepared ends of two optical fibres, the two fibres are positioned in the rectilinear groove 7 of the elongate table 3 with their prepared end faces spaced apart between the electrodes 10 and in the transversely-extending channel 9 at a distance approximating to that appropriate for fusion splicing and the spring-loaded arms 13 are closed to cause the jaws 14 to clamp the optical fibres on the uppermost surfaces of the end parts 4. By rotation of the spindles 16 by means of the knurled knobs 17, the jaws 14 of the two-part clamp assemblies 11,11', and hence the optical fibres clamped by these jaws, are moved towards or away from one another so that the prepared end faces of the optical fibres are adjusted to be at the required distance apart for fusion splicing, typically 50 micrometers, the end parts of the fibres being viewed through the microscope (not shown) detachably connected to the carriage 20. The electrical power is then switched on by means of the on/off switch 38 and the loading button 32 is slid on the shaft 31 in the direction of Arrow A (FIG. 4) to bring the control mechanism to the loaded state as shown in FIG. 2. The master switch constituted by the firing button 35 is then depressed to actuate the control mechanism.

On depression of the firing button 35, the stop 36 is released and the damping spring 27 gradually extends to reduce the force acting against the main spring 18. As the force exerted by the damping spring 27 gradually reduces to a value approximating to the force exerted on the stud 30 of the lever 21 by the main spring 18, the lever begins to pivot about the shaft 22 away from the adjustable stop 23 and towards the adjustable stop 24. The interruption of electrical contact between the electrical contact 25 and the adjustable stop 23 effected by pivotal movement of the lever 21 causes an arc to be initiated between the transversely-spaced electrodes 10 to bring end parts of the optical fibres to a softened state. The initiation of the arc is thus synchronised with the initiation of pivotal movement of the lever 21. The damped rate of pivotal movement of the lever 21, and hence the damped rate of movement of the jaw 14 of the two-part clamp assembly 11 and of the optical fibre clamped by the jaw to the associated end part 4 towards the optical fibre clamped by the jaw 14 of the two-part clamp assembly 11' to the uppermost surface of the associated end part 4, is such that the time which elapses during the initiation of pivotal movement of the lever, the consequent initiation of movement of the jaw 14 of the two-part clamp assembly 11 and of the optical fibre clamped by the jaw to the associated end part 4, the consequent initiation of the arc and the subsequent abutment of the prepared ends of the optical fibres is a predetermined period, typically 0.5 seconds, sufficient to allow the prepared ends of the optical fibres to achieve an appropriate softened state before they abut one another. Pivotal movement of the lever 21, and hence stuffing of the abutting ends of the optical fibres, continues until the electrical contact 25 of the lever abuts the adjustable stop 24, thus limiting the distance by which the softened prepared ends of the optical fibres are stuffed together after abutment.

At the end of the interval between the initiation of the arc and the abutment of the prepared and softened ends of the optical fibres, the power of the arc is increased to a level such that the ends of the fibres fuse together to form a substantially longitudinally continuous optical fibre. The arc then continues to fire for a predetermined period, sufficient to allow the surface tension of the molten fibres to correct any misalignment of the fibre axes, before being automatically extinguished. The time taken for a complete fusion splice to be effected by the apparatus is typically 5 seconds.

When the optical fibre fusion splice has been completed, the spliced fibres can be removed from the splicing station and mechanical protection for the fusion splice can be provided. The control mechanism of the splicing station 1 can then be reloaded as described for effecting of a further optical fibre splice.

Although the improved apparatus of the present invention has been generally described, and further described and illustrated by way of example with reference to the accompanying drawings, as being suitable for effecting a fusion splice between prepared and axially aligned end parts of two optical fibres, i.e. a pair of axially aligned optical fibres, it is to be understood that the claims forming part of the specification of this application include within their scope apparatus suitable for effecting fusion splices between prepared and axially aligned end parts of two or more than two pairs of optical fibres.

What I claim as my invention is:

1. Apparatus for effecting a fusion splice between prepared and axially aligned end parts of two optical fibres, which apparatus comprises a splicing station comprising an elongate table comprising at least one surface for supporting prepared and axially aligned end parts of two optical fibres and a pair of electrodes transversely spaced on opposite sides of said elongate table intermediate of its ends; high voltage circuitry for striking an arc between said transversely spaced electrodes for fusion splicing axially aligned end parts of two optical fibres positioned therebetween; devices disposed near opposite ends of the elongate table for holding end parts of two optical fibres that have been axially aligned on said table with their prepared end faces spaced a predetermined distance apart at a region intermediate of said holding devices and between said transversely spaced electrodes, at least a part of at least one of said holding devices being constrained to move to a limited extent towards or away from the other holding device in a direction substantially parallel to axially aligned end parts of two optical fibres when supported on said table so that when said constrained part of the movable holding device is constrained to move to a limited extent towards said other holding device the end part in the movable holding device will be moved axially towards the other end part; mechanical means comprising at least one main spring so disposed as to urge said constrained part of the movable holding device towards said other holding device and at least one damper comprising at least one supplementary spring which is acting against forces exerted by said main spring and which must be overcome by said main spring for controlling movement of said constrained part of the movable holding device towards said other holding device; and a master switch for actuating said high voltage circuitry and said mechanical control means, the arrangement being such that, when said switch is operated to cause an arc to be struck between said transversely spaced electrodes and to actuate said mechanical control means, the rate of controlled movement of said constrained part of the movable holding device towards the other holding device will be such that a predetermined period of time will elapse between striking of the arc and abutment of the prepared end faces of the axially aligned end parts of the fibres sufficient for the arc to bring said two end parts to a softened state appropriate for fusion splicing and that, thereafter, said prepared and softened end faces will be urged into abutting relationship so that a fusion splice between said abutting axially aligned end parts will be effected.

2. Apparatus as claimed in claim 1, wherein the optical fibre holding devices each comprise a two-part clamp for gripping an end part of an optical fibre.

3. Apparatus as claimed in claim 2, wherein the main spring is housed in one part of one of the two-part clamps and wherein the damper is housed in a carriage which is disposed intermediate of the holding devices and which is pivotally mounted about an axis parallel to and transversely spaced from axially aligned end parts of two optical fibres when supported on the elongate table.

4. Apparatus as claimed in claim 1, wherein at least part of the mechanical means for controlling movement of said part of the movable holding device towards said other holding device is supported by a carriage which is disposed intermediate of the holding devices and which is pivotally mounted about an axis parallel to and transversely spaced from axially aligned end parts of two optical fibres when supported on the elongate table.

5. Apparatus as claimed in claim 1, wherein the transversely spaced electrodes are retractable and are constrained to move towards and away from each other in a direction substantially parallel to their axes.

6. Apparatus as claimed in claim 1, wherein the splicing station with its elongate table and transversely spaced electrodes, the high voltage circuitry for striking an arc between the electrodes, and the longitudinally spaced holding devices and associated mechanical control means are housed in a casing and a low voltage power source is housed in a casing which is separately formed with respect to the casing of the splicing station, which power source can be electrically connected to the high voltage circuitry by a flexible electric cable.

7. Apparatus as claimed in claim 6, wherein the casing housing the low voltage power source is adapted to be supported on a belt worn by an operator.

8. Apparatus as claimed in claim 6, wherein the casing housing the splicing station with its elongate table and electrodes, the high voltage circuitry, and the holding devices and associated mechanical control means is of such a size that it can readily be held in a hand of an operator.

9. Apparatus as claimed in claim 1, wherein the surface of the elongate table has formed therein for maintaining end parts of two optical fibres in substantially axial alignment, an open-ended substantially rectilinear groove which extends over at least a part of the length of the table between and substantially normal to the transversely spaced electrodes.

10. Apparatus for effecting a fusion splice between prepared and axially aligned end parts of two optical fibres, which apparatus comprises a splicing station comprising an elongate table comprising at least one surface for supporting prepared and axially aligned end parts of two optical fibres and a pair of electrodes transversely spaced on opposite sides of said elongate table intermediate of its ends; high voltage circuitry for striking an arc between said transversely spaced electrodes for fusion splicing axially aligned end parts of two optical fibres positioned therebetween; devices disposed near opposite ends of the elongate table for holding end parts of two optical fibres that have been axially aligned on said table with their prepared end faces spaced a predetermined distance apart at a region intermediate of said holding devices and between said transversely spaced electrodes, at least a part of at least one of said holding devices being constrained to move to a limited extent towards or away from the other holding device in a direction substantially parallel to axially aligned end parts of two optical fibres when supported on said table so that when said constrained part of the movable holding device is constrained to move to a limited extent towards said other holding device the end part in the movable holding device will be moved axially towards the other end part; mechanical means for controlling movement of said constrained part of the movable holding device towards said other holding device, said mechanical means being supported by a carriage which is disposed intermediate of the holding devices and which is pivotally mounted about an axis parallel to and transversely spaced from axially aligned end parts of two optical fibres when supported on the elongate table; and a master switch for actuating said high voltage circuitry and said mechanical control means, the arrangement being such that, when said switch is operated to cause an arc to be struck between said transversely spaced electrodes and to actuate said mechanical control means, the rate of controlled movement of said constrained part of the movable holding device towards the other holding device will be such that a predetermined period of time will elapse between striking of the arc and abutment of the prepared end faces of the axially aligned end parts of the fibres sufficient for the arc to bring said two end parts to a softened state appropriate for fusion splicing and that, thereafter, said prepared and softened end faces will be urged into abutting relationship so that a fusion splice between said abutting axially aligned end parts will be effected.

11. Apparatus for effecting a fusion splice between prepared and axially aligned end parts of two optical fibres, which apparatus comprises a splicing station comprising an elongate table comprising at least one surface for supporting prepared and axially aligned end parts of two optical fibres and a pair of electrodes transversely spaced on opposite sides of said elongate table intermediate of its ends, said transversely spaced electrodes being retractable and being constrained to move towards and away from each other in a direction substantially parallel to their axes; high voltage circuitry for striking an arc between said transversely spaced electrodes for fusion splicing axially aligned end parts of two optical fibres positioned therebetween; devices disposed near opposite ends of the elongate table for holding end parts of two optical fibres that have been axially aligned on said table with their prepared end faces spaced a predetermined distance apart at a region intermediate of said holding devices and between said transversely spaced electrodes, at least a part of at least one of said holding devices being constrained to move to a limited extent towards or away from the other holding device in a direction substantially parallel to axially aligned end parts of two optical fibres when supported on said table so that when said constrained part of the movable holding device is constrained to move to a limited extent towards said other holding device the end part in the movable holding device will be moved axially towards the other end part; mechanical means for controlling movement of said constrained part of the movable holding device towards said other holding device; and a master switch for actuating said high voltage circuitry and said mechanical control means, the arrangement being such that, when said switch is operated to cause an arc to be struck between said transversely spaced electrodes and to actuate said mechanical control means, the rate of controlled movement of said constrained part of the movable holding device towards the other holding device will be such that a predetermined period of time will elapse between striking of the arc and abutment of the prepared end faces of the axially aligned end parts of the fibres sufficient for the arc to bring said two end parts to a softened state appropriate for fusion splicing and that, thereafter, said prepared and softened end faces will be urged into abutting relationship so that a fusion splice between said abutting axially aligned end parts will be effected.

* * * * *